C. BOUILLON.
CHANGE GEAR MECHANISM.
APPLICATION FILED AUG. 11, 1920.

1,415,515.

Patented May 9, 1922.
2 SHEETS—SHEET 1.

C. BOUILLON.
CHANGE GEAR MECHANISM.
APPLICATION FILED AUG. 11, 1920.

1,415,515.

Patented May 9, 1922.
2 SHEETS—SHEET 2.

Inventor
Constant Bouillon
By Attorneys
Southgate & Southgate

Witness
C. F. Mason

UNITED STATES PATENT OFFICE.

CONSTANT BOUILLON, OF TORRINGTON, CONNECTICUT, ASSIGNOR TO HENDEY MACHINE COMPANY, OF TORRINGTON, CONNECTICUT, A CORPORATION OF CONNECTICUT.

CHANGE-GEAR MECHANISM.

1,415,515.

Specification of Letters Patent.

Patented May 9, 1922.

Application filed August 11, 1920. Serial No. 402,811.

*To all whom it may concern:*

Be it known that I, CONSTANT BOUILLON, a citizen of the United States, residing at Torrington, in the county of Litchfield and State of Connecticut, have invented a new and useful Change - Gear Mechanism, of which the following is a specification.

This invention relates to change gear mechanism designed for use in lathes, drills and other machine tools, in which a wide range of working speeds is desired.

It is the object of my invention to provide a mechanism of this character by which a large number of speed changes may be maintained by means of a relatively small number of change gears, and by the use of simple and reliable controlling devices.

In the preferred form, I mount the gears upon three parallel shafts and control their positions by means of two hand shift levers. By using three gears on each shaft, I obtain nine different speed ratios between the driving and the driven shafts. My invention further relates to arrangements and combinations of parts which will be hereinafter described and more particularly pointed out in the appended claims.

A preferred form of my invention is shown in the drawings, in which

Figure 1:
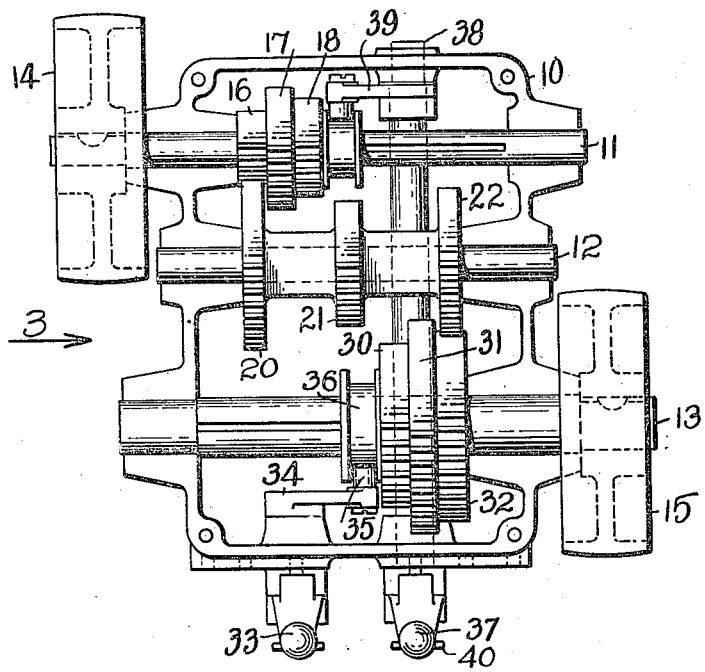
Fig. 1 is a plan view of my improved change gear mechanism.
Figure 2:
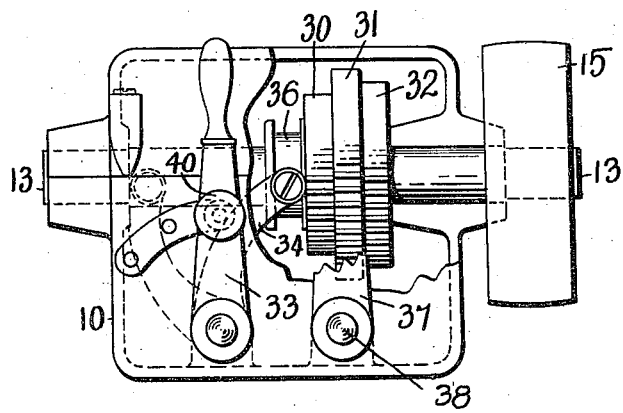
Fig. 2 is a front elevation, partly in section.
Figure 3:
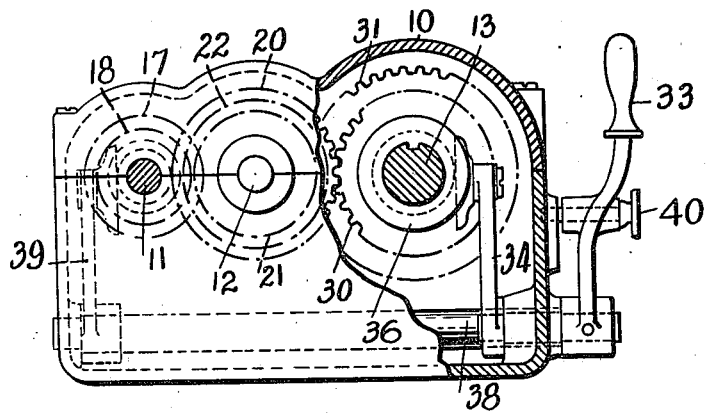
Fig. 3 is an end elevation thereof.

Referring to Figs. 1, 2 and 3, I have shown a casing 10 provided with fixed bearings for a driving shaft 11, an intermediate shaft 12 and a driven shaft 13. The shafts 11, 12 and 13 are parallel to each other and the shafts 11 and 13 may be provided with pulleys 14 and 15 through which the power is received and delivered.

A set of three gears 16, 17 and 18 is mounted to slide as a unit on the driving shaft 11. A second set of three spaced gears 20, 21 and 22 is mounted on the intermediate shaft 12 in fixed angular relation. A third set of three gears, 30, 31 and 32 is mounted to slide as a unit upon the driven shaft 13. The first and third sets of gears are preferably keyed to slide on their respective shafts while the gears 20, 21 and 22 are fixed to the shaft 12 or rotate together as a unit thereon.

A hand lever 33 is connected through an arm 34, roll 35 and grooved collar 36 to shift the third set of gears axially along the shaft 13. A second hand lever 37 is similarly connected through a rearwardly extending shaft 38 and arm 39 to control the position of the first set of gears. Locking pins 40 may be provided to hold the gears in any desired position.

The gears in the different sets are so proportioned that the pairs of gears 16 and 20, 17 and 21 and 18 and 22 contain the same total number of teeth and will thus mesh accurately with each other. Similarly the pairs of gears 20 and 30; 21 and 31; and 22 and 32 have the same total number of teeth and mesh at the same distance between centers. By means of the hand levers 33 and 37, the shafts 11 and 12 may be connected through any one of three pairs of gears and the shafts 12 and 13 may be similarly connected through any one of three additional pairs of gears.

The combination of these two adjustments permits me to obtain nine different speed ratios between the driving shaft 11 and the driven shaft 13, which result is obtained by the use of only nine change gears.

Figures 4, 5:
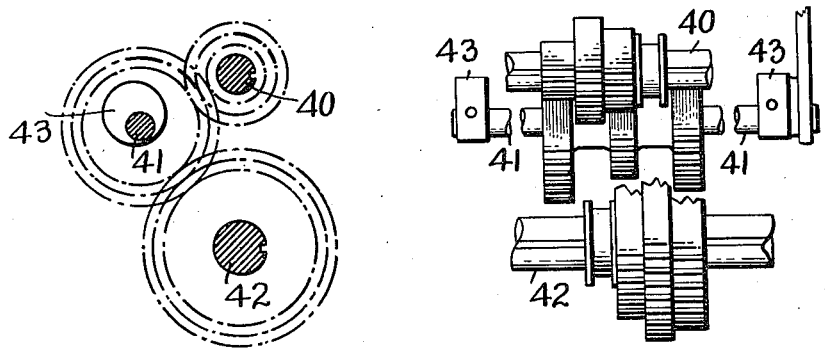
Fig. 4 is a partial plan view of a modification.
Fig. 5 is an end elevation of the parts shown in Fig. 4.

In Figs. 4 and 5, I have shown a modified arrangement, with a driving shaft 40, an intermediate shaft 41 and a driven shaft 42. The intermediate shaft 41 is mounted in eccentric bearings 43, the construction being similar to that commonly found in the back gears of an engine lathe. By moving the eccentric bearings to swing the intermediate gears out of mesh, the first and third sets of gears may be moved axially while the gears are separated. This arrangement permits me to shorten the distance between the gears on the intermediate shaft, a feature which is of considerable importance where space is limited. Otherwise, the construction and operation of the modification is substantially the same as that previously described.

Having thus described my invention, it will be evident that changes and modifications can be made therein by those skilled in the art within the spirit and scope of my invention as set forth in the claims, and I do not wish to be otherwise limited to the details herein disclosed but what I claim is:—

1. A change gear mechanism comprising a driving shaft, an intermediate shaft and a driven shaft, a set of three gears forming a unit rotatable with and slidable on said driving shaft, a second set of three gears forming a unit rotatable with and slidable on said driven shaft, a third set of three gears mounted in fixed angular and spaced relation on said intermediate shaft, and means to slide said first and second sets of gears longitudinally relatively to said third set of gears, each intermediate gear being adapted to mesh directly with one driving gear and with one driven gear.

2. A change gear mechanism comprising a driving shaft, an intermediate shaft and a driven shaft, a set of three gears forming a unit rotatable with and slidable on said driving shaft, a second set of three gears forming a unit rotatable with and slidable on said driven shaft, a third set of three gears mounted in fixed angular and spaced relation on said intermediate shaft, means to slide said first and second sets of gears axially relatively to said third set of gears, and means to move said intermediate shaft toward and away from said driving and driven shafts.

In testimony whereof I have hereunto affixed my signature.

CONSTANT BOUILLON.